March 31, 1964 D. H. NAU 3,126,812
COFFEE PREPARING AND DISPENSING APPARATUS
Filed April 20, 1961 4 Sheets-Sheet 1

Inventor:
David H. Nau,
By Hofgren, Brady, Wegner,
Allen & Stellman, Attys.

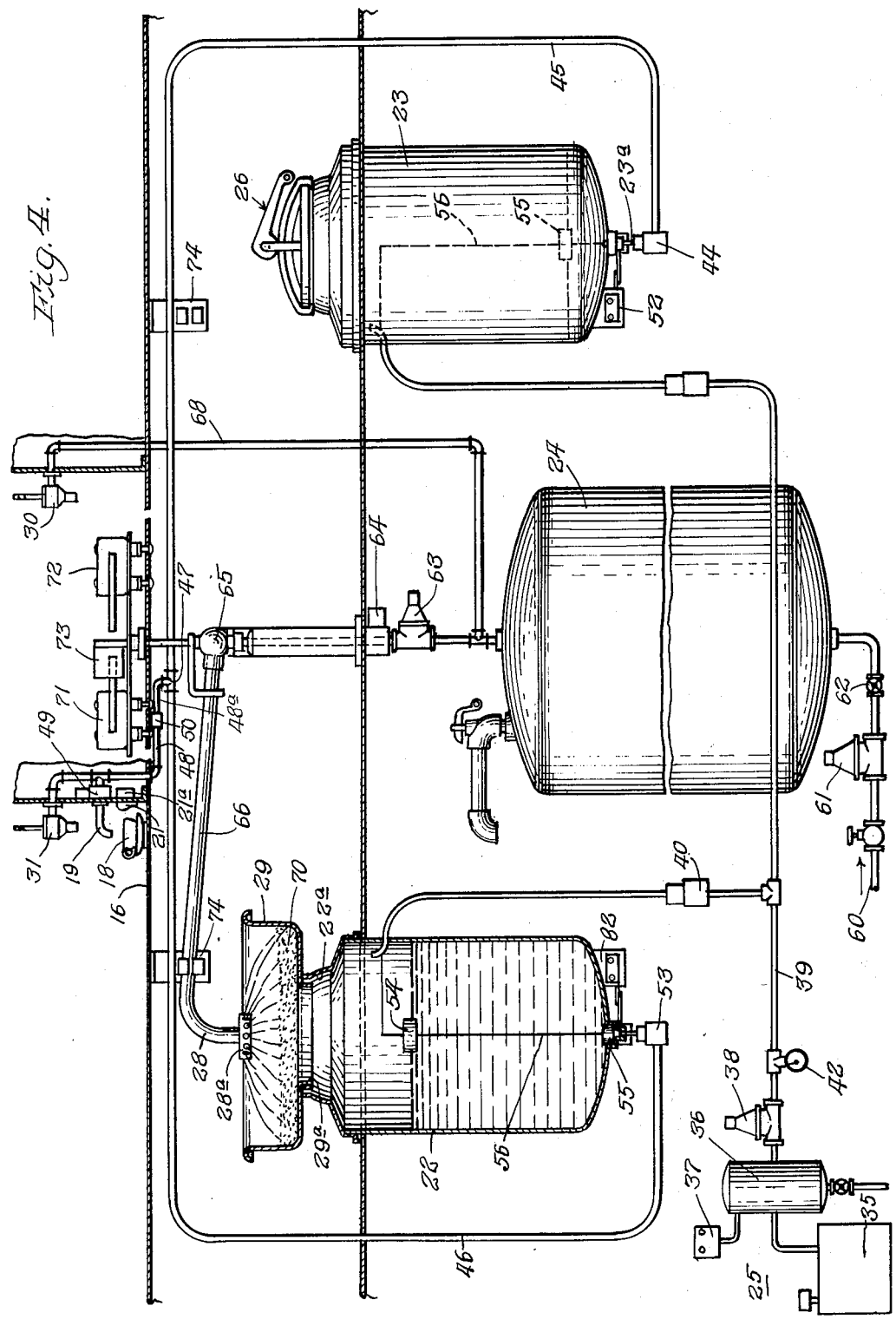

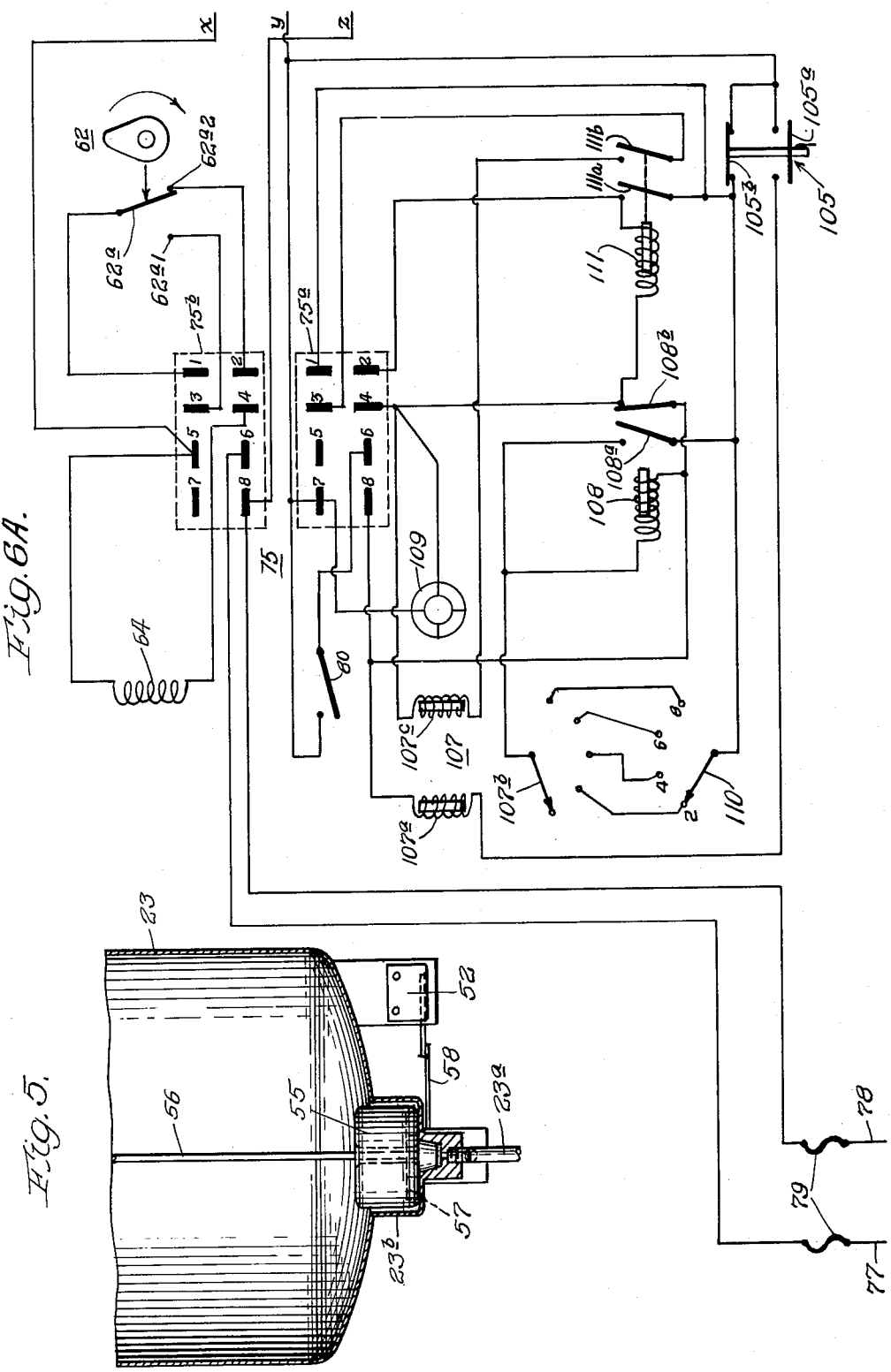

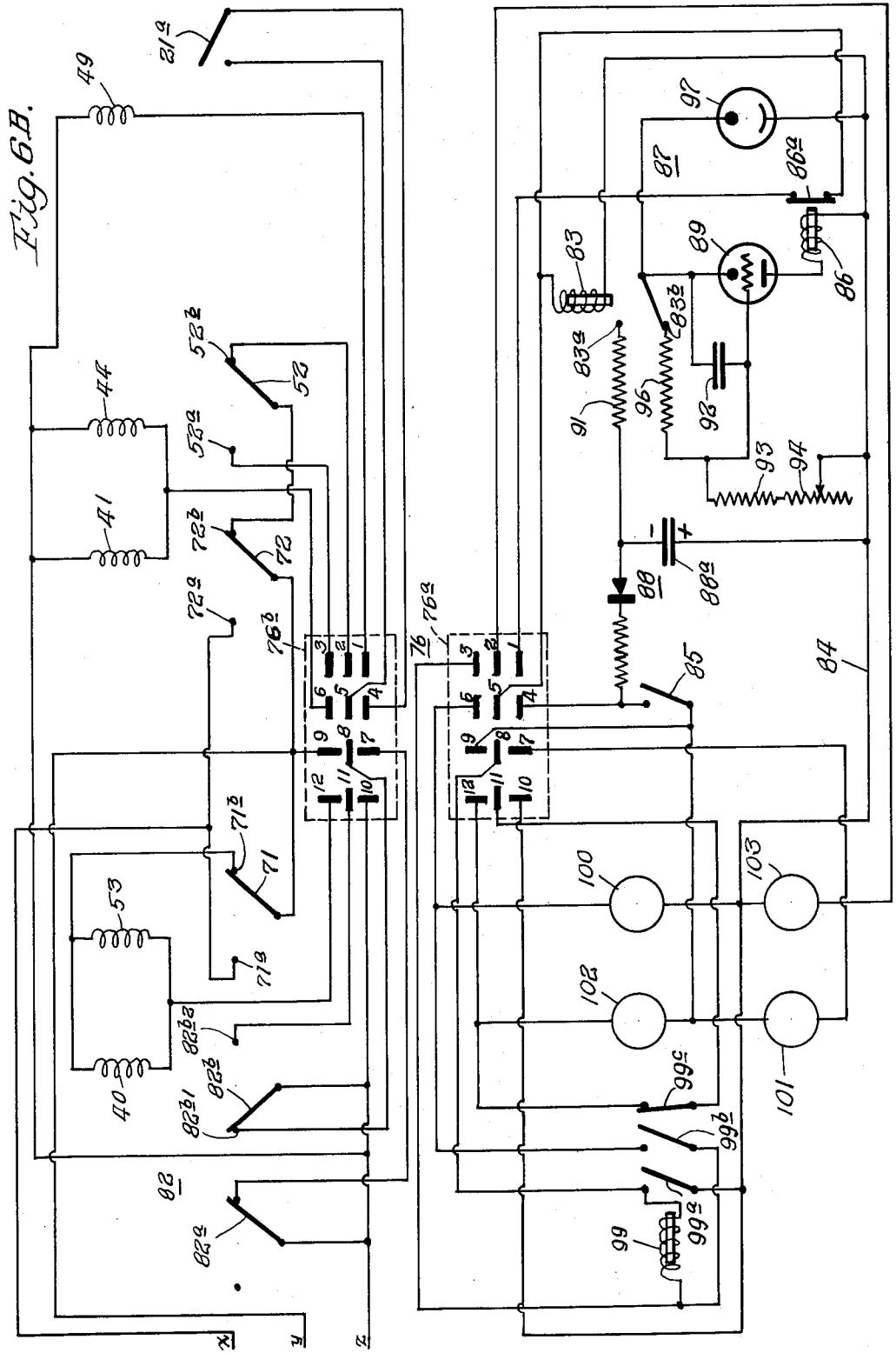

United States Patent Office 3,126,812
Patented Mar. 31, 1964

3,126,812
COFFEE PREPARING AND DISPENSING APPARATUS
David H. Nau, 616 Central Ave. SE.,
Albuquerque, N. Mex.
Filed Apr. 20, 1961, Ser. No. 104,320
7 Claims. (Cl. 99—283)

This invention is concerned with a beverage preparing and dispensing apparatus and more particularly with a semiautomatic coffee or tea preparing and dispensing apparatus particularly intended for restaurant and cafeteria use.

In recent years there has been a great deal of innovation in beverage mechandising apparatus, and particularly in coin-controlled, operatorless machines. However, many restaurants and cafeterias continue to use the large urn units which stand on legs on top of a counter. These units must be serviced from the top and require an attendant to stand on a chair or a stool to reach them. They are hard to clean satisfactorily and are rather unsightly.

A principal object of this invention is the provision of a beverage brewer and dispenser, particularly suited for cafeteria and restaurant use. The apparatus disclosed and claimed herein is compact, easy to service and clean, and relatively simple to maintain and operate. The apparatus incorporates an automatic dispensing control which eliminates the need for a full time attendant.

One object of the invention is the provision of a beverage preparing and dispensing apparatus including a shelf for supporting a beverage receiver and having a dispensing point operably associated therewith, a container for prepared beverage, conduit means interconnecting the container with the dispensing point, means for causing beverage to flow from the container to the dispensing point, and means responsive to the presence of a beverage receiver on the supporting shelf adjacent the dispensing point for initiating operation of the beverage flow-causing means, with substantially all the apparatus including the prepared beverage container and the flow-causing means located below the level of the shelf. Another feature of the invention is that the shelf or counter has an upstanding panel thereon dividing the counter into an exposed dispensing shelf portion and a hidden service shelf portion, with the beverage container and flow-causing means being substantially entirely below the level of the hidden service portion of the counter. The major heated elements of the system, including the water heater and the dispensing container, are hidden below the counter and behind the upstanding panel, isolated from the customer. Furthermore, all servicing operations are carried on at the rear of the apparatus with no need to interrupt or delay dispensing.

A further feature is that the dispensing container which is located behind the upstanding panel has an open top in which a beverage leaching basket is receivable, all located behind the upstanding panel. An outlet for brewing liquid is movable into a position over the basket, and behind the panel, and means are provided for controlling the flow of brewing liquid from a supply and include means responsive to the position of the outlet head, so that brewing liquid cannot flow unless the brewing head is in position over the leaching basket.

Yet another feature is that the prepared beverage container is sealed during dispensing, and subjected to an elevated pressure from a pump, to force the beverage out through the conduit to the dispensing point, which is above the container. Still a further feature is that the apparatus includes a pair of beverage containers, each provided with air and beverage valves, and the conduit means for conducting the beverage from the containers to the dispensing point includes a dispensing valve. Automatic control means are provided which open both the air and beverage valves associated with the container from which beverage is to be dispensed, and the dispensing valve is actuated in a desired manner, as by the presence of a beverage receiver to be filled.

Still another feature is that the apparatus includes a dispensing means which is responsive to the presence of a receptacle to be filled, together with the timer which controls the duration of the dispensing cycle.

And a further feature is the incorporation in the apparatus of a sensing means for determining when a beverage container approaches the empty condition, including a float within the container and switch means outside the container and actuated in accordance with the level of the float. The apparatus preferably includes two beverage containers, and when one is emptied, beverage is automatically dispensed from the other, without any loss of time.

Another feature of the invention is the provision of a method of brewing a beverage which comprises establishing a quantity of brewed beverage desired, providing a quantity of ground beverage ingredient, and flowing through the ground beverage ingredient a quantity of liquid beverage ingredient in excess of the desired quantity of beverage by an amount of the order of the amount of liquid left in the ground ingredient at the end of the brewing process. Still a further feature is the provision of a brewing control arrangement in the system having a beverage container, a brewer and a source of brewing water, and including means for selecting a quantity of beverage to be brewed, and means responsive to the quantity of beverage ingredient supplied to the brewer, for stopping the brewing operation when the appropriate quantity has been supplied.

Further features and advantages of the invention will readily be apparent from the following specification and from the drawings in which:

FIGURE 4 is a diagrammatic flow sheet of the apparatus;

FIG. 5 is a fragmentary section taken through the lower portion of a prepared beverage container; and FIGURES 6A and 6B are a schematic diagram of a control circuit for the apparatus.

The beverage brewing and dispensing apparatus disclosed herein will be described and generally referred to as a "coffee brewing and dispensing apparatus." Obviously, the apparatus can be used for other beverages, as tea, if desired. Certain features of the apparatus are particularly designed for self-service operation, as in a cafeteria, providing for the preparation and service of beverage with a minimum of attention and supervision. Certain of the features of the apparatus, as the automatic transfer of the dispensing operation to the full container upon depletion of the container in operation, and the automatic cessation of the brewing operation, are important in both cafeteria and restaurant operations.

Figure 1:
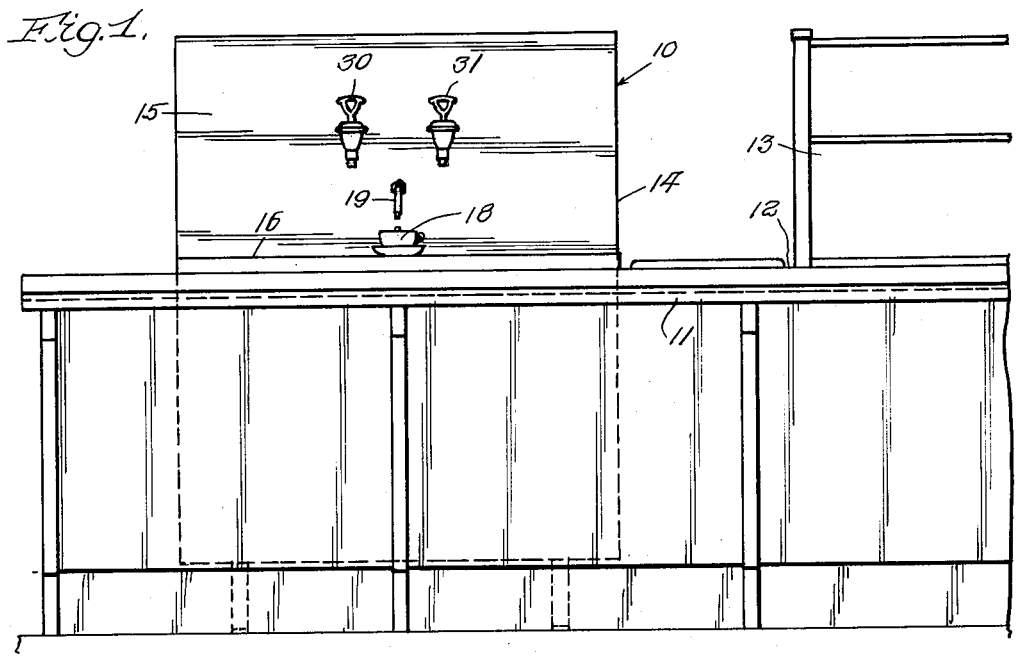
FIGURE 1 is a front elevation of an apparatus embodying the invention.

The beverage preparing and dispensing apparatus indicated generally as 10 illustrated in FIGURE 1 is incorporated in a cafeteria serving installation which includes a tray shelf 11, steam table 12, and an upstanding divider panel 13 which separates the tray shelf from the steam table. The apparatus 10 is enclosed in a housing 14, as of stainless steel, which has a generally horizontal counter from which a panel 15 extends upwardly, generally in alignment with the divider panel 13 of the cafeteria line. Panel 15 divides the counter into an exposed dispensing shelf portion 16 and a hidden service shelf portion 17. Shelf portion 16 is adapted for supporting a beverage receiver, as a cup and saucer 18. A beverage dispensing conduit outlet 19 projects through the face of panel 15 above the center of shelf 16 and beneath which the cup 18 may be positioned. The beverage receiving cup 18 placed beneath the conduit outlet 19 on shelf 16 engages a dispensing actuator 21 (FIGURE 2) which initiates a dispensing operation and causes the discharge of one portion of beverage, as will be described in detail.

A pair of prepared beverage containers 22 and 23 are carried by the service portion 17 of the horizontal platform of the apparatus and have open top portions extending above the shelf. A major portion of the body of containers 22 and 23 is positioned below the shelf and within the lower portion of housing 14. A water heater 24 and air compressor 25 are also located in the lower portion of the housing, as will appear in more detail below. A container 22 or 23 with brewed beverage in it is fitted with a cap or cover, as indicated 26, and the interior of the container is placed under an elevated air pressure. Actuation of a dispensing valve in a conduit connected between the container and the beverage outlet 19, permits liquid to flow from the container to the elevated dispensing outlet 19.

Figure 3:
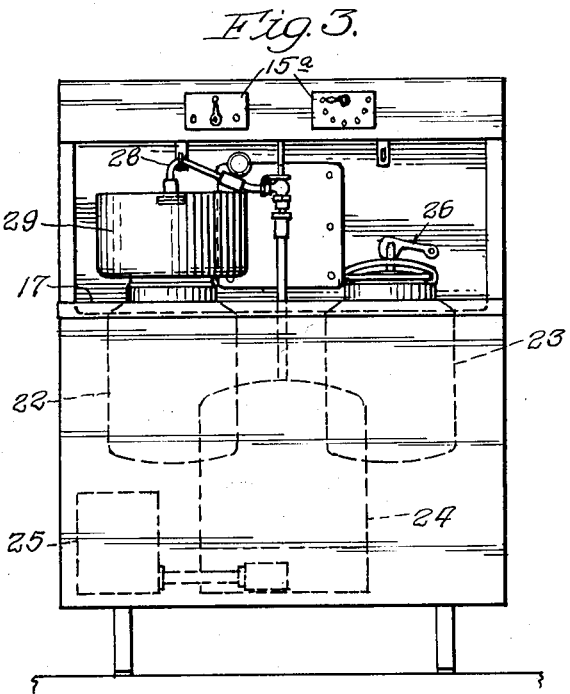
FIGURE 3 is a rear elevation of the apparatus.

A brewing or spray head 28 is connected with hot water heater 24 and may be moved to positions above either of the containers 22 or 23. During the brewing operation, a leaching basket 29, which contains a ground beverage ingredient, as ground coffee, is positioned over the open top of the beverage container, as shown in FIGURE 3, and filling head 28 is swung into position over the basket. Hot water from heater 24 is then sprayed over the ground coffee through which it percolates extracting the coffee essence, and ultimately collecting in container 22. Controls for the apparatus are conveniently located above the brewing apparatus on the rear of panel 15, as shown at 15a, FIGURE 3. Details of the brewing operation and the automatic controls therefor will be discussed below.

A pair of manually operable spigots 30 and 31 are provided on the upstanding panel 13 and connnected directly with the hot water tank 24, and the brewed beverage containers, respectively. Spigot 30 may be used for drawing hot water for tea or other beverages, while spigot 31 permits the filling of bulk beverage containers.

Figure 2:
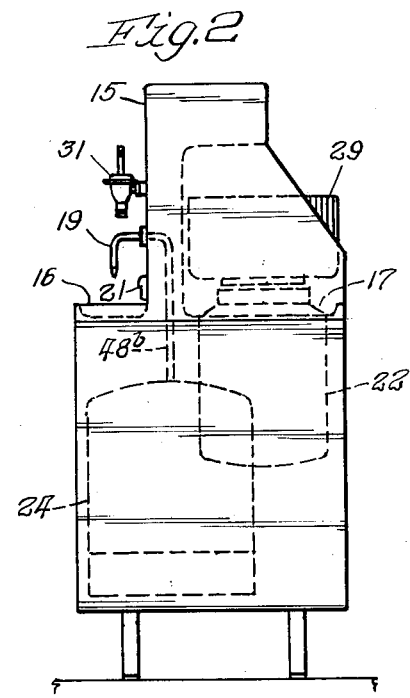
FIGURE 2 is an end view of the apparatus.

The apparatus illustrated in FIGURES 1–3 fits into a cafeteria installation, with the dispensing shelf 16 substantially at the tray shelf and steam table level, and the upstanding panel 15 corresponding generally with the divider panel 13 of the cafeteria steam table. The coffee preparing and storage apparatus is substantially completely hidden from the front and most of it is located below the level of the service platform 17.

The over-all operation of the system is best understood with reference to the diagrammatic flow sheet of FIGURE 4. The system is illustrated with a quantity of beverage in right beverage container 23, from which the beverage may be dispensed. The compressed air source 25 includes an air pump 35, an air tank 36 provided with a pressure control 37, a pressure regulator 38, and a pressurized conduit 39, connected with each of containers 22 and 23 through electrically operated air valves 40 and 41, respectively. A guage 42 indicates the pressure in the system. When dispensing beverage from container 23, for example, air valve 41 is open so that a constant elevated pressure is maintained within the beverage container. A beverage outlet 23a at the bottom of container 23 is connected through beverage control valve 44 to a beverage conduit 45 which joins a similar beverage conduit 46 from container 22 at a T connection 47. A common beverage conduit portion 48 is connected from T 47 to the dispensing outlet 19 and to manually controlled spigot 31. A beverage dispensing valve 49 controls the flow of beverage to dispensing point 19.

A portion 48a of beverage conduit 48 between T 47 and valve 49 extends through an electric heater 50 so that the coffee in the conduit will not be unduly cooled.

When a beverage receiver, as cup 18, is placed on the dispensing shelf 16, in engagement with dispensing actuator 21, a suitable timer circuit and dispensing mechanism, which will be described below, are actuated causing dispensing valve 49 to open for a predetermined period. While the valve is open, the compressed air in container 23 forces a portion of the beverage out through conduits 45 and 48 to the cup 18.

When the container 23 is substantially empty, as with only a few ounces of beverage remaining, a switch 52 is actuated causing valves 41 and 44 to close and opening air valve 40 and beverage valve 53, connecting the left container 22 for dispensing. It is understood that a cover, as the cover 26, has been affixed to the container 22 before the switchover. Dispensing then continues in the manner described above from the filled beverage container 22. Each of the containers 22 and 23 is provided with a float 54 and 55, respectively, movable on a guide member as rod 56. Each float carries an actuator means to which the associated switch outside the container is responsive. The construction is best seen in FIGURE 5. Float 55 has a ceramic magnet 57 of annular configuration mounted inside the float shell, and adjacent the bottom surface thereof. The lower portion of container 23 is formed with a well 23b into which the float moves as the liquid level drops. Switch 52 mounted outside container 23, has an armature 58 which extends along the undersurface of a portion of well 23b. As the float 55 approaches the bottom of the well, armature 58 is attracted upwardly by magnet 57 and switch 52 is actuated changing the dispensing of beverage to the other container. This arrangement eliminates the necessity for electrical connections to the pressure-sealed beverage container and provides for the external sensing of movement of the float, without the connection through the container wall.

Water, for preparing beverage as by a brewing operation, is provided from a suitable source through a main 60, pressure regulator 61, and water meter 62 to a water heater 24. Heated water passes from the water heater 24 through a further pressure regulator 63, a brewing valve 64, swivel connector 65, and arm 66 to brewing head 28 which has a spray fitting 28a. Hot water spigot 30 is connected through conduit 68 with the outlet of water heater 24.

Leaching basket 29 is shown in FIGURE 4 positioned in the open top 22a of beverage container 22. Basket 29 has a capacity sufficient to hold the desired quantity of ground beverage ingredient 70, as ground coffee, and has a suitable filter in the bottom thereof. The downturned lip 29a seats within the open top 22a of the beverage container. When it is desired to prepare a quantity of beverage in an empty container, the appropriate quantity of ground coffee is placed in leaching basket 29 and the basket positioned as shown in FIGURE 4. Spray head 28 is positioned over the basket and the brewing operation initiated by opening valve 64, allowing hot water to spray over the ground coffee 70. An automatic control over the quantity of beverage brewed will be described in detail in connection with the electrical control circuit. A pair of switches 71 and 72 are provided, actuated by an extension 73 of swingable arm 66. As will appear, brew valve 64 cannot be opened unless one of the switches 71 and 72 is actuated, by positioning brewing head 28 over the top of one of containers 22 or 23. Spring clips 74 engage swingable arm 66 and hold it in each of the brewing positions.

A detailed description of the operation of the control circuit will now be given, with reference to FIGURES 6A and 6B. The two portions of the electrical control circuit shown on FIGURES 6A and 6B are interconnected through three leads, X, Y and Z, which terminate along the right edge of FIGURE 6A and left edge of FIGURE 6B. In FIGURE 6A, a plug 75a mates with corresponding socket 75b and like numbered terminals are connected together and will be so described below. Similarly, in FIGURE 6B, a plug 76a mates with socket 76b.

The terminals of the plugs and sockets will be identified in the specification by the numbers of the plug or socket with a further numeral indicating the terminal and shown on the drawing.

The control circuit is energized as from a suitable source of power as 110 volts A.C. connected with terminal leads 77 and 78. The incoming line is provided with fuses 79, and is connected with terminals 75b—6 and 75b—8 of connector 75. Master switch 80 is connected between terminal 75a—6 and terminal 75a—7, and controls the application of power to the various portions of the control circuit, and including lead Y extending between the two portions of the circuit drawing. Terminal 75b—8 is connected with lead Z. The various relays in the control circuit are shown in an unenergized condition, regardless of whether they are normally energized or unenergized during operation. The brewing interlock switches, 71 and 72, are shown in their unactuated positions, and low level or empty switch 52 associated with beverage container 23 is shown in the empty position. Similarly, switches 82a and 82b comprising the low level or empty switch 82 associated with beverage container 22, are shown in the empty position.

The operation of the dispensing circuit will first be described. It will be assumed that right beverage container 23 has beverage in it and that the associated air and beverage valves, 41 and 44, are open. The dispensing operation is initiated by closing dispensing switch 21a, associated with dispensing actuator 21, completing a circuit energizing dispensing relay 83. The circuit for this relay may be traced from one side of the line Z to terminals 76b—10, 76a—10, of connector 76, lead 84, relay 83, terminals 76a—5, 76b—5, switch 21a, terminals 76b—4, 76a—4, manual dispense switch 85, which is closed in operation, and terminals 76b—9, 76a—9, to line Y. A circuit is also completed through contact 86a associated with dispensing timer relay 86 and terminals 76a—1, 76b—1, energizing dispensing valve 49, the other terminal of which is connected to line Z. This opens the dispensing valve and beverage flows under the action of air pressure in the dispensing container to the cup 18. A dispensing timer indicated generally as 87 includes a half-wave rectifier circuit 88 connected across the line and having a direct current output developed across the filter capacitor 88a, of the indicated polarity. The timer includes a gas tube 89, as type 5823, which when conducting energizes relay 86, to stop the brewing operation. Upon initiation of the dispensing operation, relay 83 is energized as explained above, closing contact 83a associated therewith connecting the cathode of gas tube 89 with the negative terminal of supply 88, through a resistor 91, 1,000 ohms. A capacitor 92, 4 microfarads, is connected between the cathode and the control grid of tube 89 and in series with resistor network including resistor 93, 47,000 ohms, and potentiometer 94, 1 megohm, to the positive terminal of the supply. When contact 83a closes, capacitor 92 begins to charge at a rate determined by the resistance in the circuit and controlled by the setting of potentiometer 94. When the positive potential on the grid of tube 89 reaches a sufficient potential to cause the tube to fire, the tube conducts heavily energizing the relay 86, opening contact 86a, and terminating the operation. When the cup is removed from the service shelf 15, switch 21a opens and de-energizes relay 83. This permits the contact 83b to close connecting resistor 96, 100 ohms, across capacitor 92 discharging it in readiness for the next dispensing operation. A voltage regulator 97, as the type OA2, is connected across the series combination of tube 89 and relay 86, stabilizing the voltage and thus the time of operation of the timer. The quantity of beverage dispensed may be varied through adjustment of potentiometer 94 as the flow rate of the beverage is substantially constant. If a customer wishes less than a full portion (as where cream is to be added), release of dispensing actuator 21, by removing the beverage receiver, opens the energizing circuit for dispensing relay 83 and valve 49.

The operation of the air and beverage valves 40, 53, 41, and 44, for the left and right beverage containers, respectively, is controlled by relay 99. Assuming that there is beverage in the right container and that the left container is empty, relay 99 is energized. This circuit may be traced from terminal lead Y through contact 72b of the right brew switch 72, contact 52a of the right empty switch 52 (closed with beverage in the right container), terminals 76b—3, 76a—3, relay coil 99, terminals 76a—8, 76b—8, and contact 82b—1 of the left empty switch 82, to terminal lead Z. In this condition of the circuit, contact 99a is closed completing a holding circuit for relay 99 in shunt with left container empty switch 82b—1, contact 99b is closed completing a circuit through terminals 76a—6, 76b—6, energizing the air and beverage valves 41 and 44 associated with the right container, and energizing right dispense lamp 100. Contact 99c, in the circuit of the left container beverage and air valves, is open.

With left container 22 empty, contact 82a of the left empty switch is closed completing a circuit from terminal lead Z through terminals 76b—7, 76a—7, lighting left empty lamp 101. This alerts an attendant to the fact that beverage should be prepared in the left container. The beverage preparation procedure outlined above is followed, the attendant filling leaching basket 29 and placing it in position over the left container. Spray head 28 is moved into position and fresh beverage prepared. The automatic control of this operation will be described below. As fresh beverage enters left container 22, switch 82b—1 opens and 82b—2 closes. The condition of relay 99 is not affected, however, as holding contact 99a is closed. Similarly, the left container air and beverage valves 40 and 53, respectively, are not energized as relay contact 99c is open. When the beverage in right container 23 is depleted, switch 52a opens, breaking the energization circuit to relay 99 and allowing the contacts associated therewith to assume the position illustrated in FIGURE 6B. Contact 99a in the holding circuit opens as does contact 99b in the circuit of the right air and beverage valves 41 and 44. Contact 99c closes and a circuit is completed from terminal lead Z through contact 82b—2 of the left empty switch 82, terminals 76b—11, 76a—11, contact 99c, terminals 76a—12, 76b—12, the solenoid valves 40 and 53, and contact 71b of the left brew interlock, to terminal lead Y. During this period, the left dispense pilot light 102, which is connected in parallel with the left air and beverage valves 40 and 53, is energized. Right empty pilot light 103 is energized from terminal lead Y through contact 72b of the right brew switch, contact 52b of right empty switch, terminal 76b—2, terminal 76a—2, lamp 103, terminal 76a—10 and terminal 76b—10 to lead Z. Dispensing of beverage proceeds from the left container while the attendant prepares coffee in the right and when the left container is emptied, the switch 82b—1 closes again completing the energization circuit for relay 99 and returning the circuit to condition for dispensing from the right container.

If the container from which beverage is being dispensed is depleted during the course of a dispensing operation, the dispensing procedure is not affected. Coffee is merely delivered from the fresh container, and no one receives a short measure.

The brewing operation is initiated by the attendant momentarily actuating brew switch 105 after the leaching basket 29 and spray head 28 are properly positioned. With the spray head 28 in a brewing position, one of switches 71 or 72 is actuated closing the associated a contact and connecting lead X with energized lead Y. Contact 105a of brew stop switch 105 completes a circuit from lead Y energizing reset coil 107a of step relay 107. Coil 107a is connected through terminals 75a—8 and 75b—8 with power lead Z. This returns movable arm 107b of the reset relay to the position shown in FIGURE 6A. The purpose of this relay will become apparent as the description proceeds. Contact 105b of the brew start switch opens breaking the holding circuit of brew relay 108, de-energizing this relay so that the contacts 108a and 108b assume the position shown in the drawing. A circuit is completed to contact 108b energizing brew valve 64. This circuit may be followed from terminal 75b—5 through the valve, terminals 75b—4, 75a—4, contact 108b, and terminals 75a—8, 75b—8, to line conductor 78. Brew pilot light 109 is also energized through relay contact 108b. The termination of the brewing operation is controlled in accordance with the preselected brewing quantity established by the attendant. In the embodiment of the control circuit illustrated in the drawing, a selection may be made for brewing 2, 4, 6 or 8 gallons of coffee, by appropriately setting selector switch 110. As the brewing operation proceeds, water meter 62 actuates a switch 62a, between contacts 62a—1 and 62a—2 with contacts 62a—2 normally closed. After brew start switch 105 is momentarily depressed and then released, contact 105b closes completing a circuit for energizing counter relay 111. This circuit may be traced from terminal lead Y through contact 105b, terminals 75a—1, 75b—1, switch 62a—2, terminals 75b—2, 75a—2, relay 111, contact 108b of brew relay 108, terminals 75a—8 and 75b—8 to line lead 78. Contact 111a closes and completes a holding circuit for relay 111, through brew switch contact 105b and brew relay contact 108b. Contact 111b closes providing a circuit through which a momentary closing of contact 62a—1 of a water meter switch as the water meter operates completes a circuit momentarily energizing step coil 107c of step relay 107. With each energization of coil 107c, switch arm 107b of the step relay is advanced to succesive positions. When switch arm 107b reaches the point completing a circuit with selector switch 110, a circuit is established energizing brew relay 108. This closes contact 108a completing a holding circuit for the brew relay and opens contact 108b breaking the energization circuit for brew valve 64 and for counter relay 111, ending the brewing operation.

When the brewing liquid ceases flowing, the attendant removes the leaching basket 29 and seals the top of the beverage container with a cover 26. The leaching basket may be washed in readiness for the next brewing operation.

The brewing control circuit provides for an exact control of the quantity of beverage prepared by causing a greater quantity of brewing liquid to flow into the leaching basket 29 than is desired. This compensates for the liquid retained in the ground coffee. It has been found that the quantity of brewing liquid should exceed the quantity of beverage desired by approximately six percent.

The foregoing detailed description is given for clearness of understanding only and no unnecessary limitations are to be understood therefrom, as some modifications will be obvious to those skilled in the art.

I claim:

1. A beverage brewing and dispensing apparatus for use in conjunction with a cafeteria line, comprising: a counter; an upstanding panel on said counter dividing the counter into an exposed dispensing shelf portion and a hidden service shelf portion; a prepared beverage container; a brew basket operably associated with the beverage container; a movable water head which has a position operably associated with said brewing basket, said basket and head being behind said panel and said container being substantially completely below said counter; a dispensing outlet on said panel above said counter; conduit means interconnecting said container with said dispensing outlet; and means for causing beverage to flow from said container to said dispensing outlet, said flow-causing means being below said counter.

2. A beverage brewing and dispensing apparatus for use in conjunction with a cafeteria line, comprising: a counter; an upstanding panel on said counter dividing the counter into an exposed dispensing shelf portion with a dispensing means on the panel and a hidden service portion; a dispensing container for brewing beverage having an open top above the level of said service portion; conduct means connecting said container with said dispensing means; means for causing beverage to flow from said container through said conduit to said dispensing means; a beverage leaching basket received in the top opening of said beverage container and below the top of said panel; an outlet head for brewing liquid movable from a position away from said basket into a position over said basket and behind said panel; a supply of brewing liquid connected with said outlet head; and means for controlling the flow of brewing liquid to said outlet head and including means responsive to the position of said outlet head whereby brewing liquid flows only when said head is positioned over said basket.

3. A beverage brewing and dispensing apparatus for use in conjunction with a cafeteria line, comprising: a counter; an upstanding panel on said counter dividing the counter into an exposed dispensing shelf portion with a dispensing means on the panel above said shelf and a hidden service portion; a dispensing container for brewing beverage having an open top above the level of said service portion and below the top of said panel, the major portion of said container being below said counter; conduit means connecting said container with said dispensing means; means including a source of air under pressure coupled to said container and a lid sealable on said open top for causing beverage to flow from said container to said dispensing means; a beverage leaching basket received in the top opening of said beverage container and below the top of said panel; an outlet head for brewing liquid swingably mounted behind said panel for movement into and out of a position over said basket; a supply of brewing liquid connected with said outlet head; means for controlling the flow of brewing liquid to said outlet head and including means actuated when said outlet head is in position over said leaching basket whereby brewing liquid flows only when said head is positioned over said basket.

4. A beverage brewing and dispensing apparatus for use in conjunction with a cafeteria line, comprising: a shelf for supporting a beverage receiver and having a dispensing point operably associated therewith and spaced thereabove; a plurality of containers for brewing beverage; means selectively connecting said containers with said dispensing point; a source of compressed air selectively connected with said containers for causing beverage to flow from the containers to said dispensing point; a dispensing valve between said containers and said dispensing point; means responsive to the presence of a beverage receiver on said supporting shelf adjacent said dispensing point for initiating operation of said dispensing valve; and means responsive to an empty condition in one container for placing another container under air pressure.

5. A beverage brewing and dispensing apparatus, of the character described in claim 4 wherein electrically operated valves are connected with a compressed air inlet and beverage outlet of each container and switch means are provided for each container, the switch means being responsive to an empty condition of the associated container to complete an energizing circuit for the electrically operated valves associated with the compressed air inlet and beverage outlet of another container.

6. A beverage brewing and dispensing apparatus, comprising: a plurality of prepared beverage containers each having an air inlet and a beverage outlet; a source of compressed air connected with each of said air inlets; conduit means interconnecting said beverage outlets with a dispensing point, and including a common conduit portion; an air valve between said source and the air inlet of each container; a beverage valve between the beverage outlet of each container and said common conduit portion; control means for said air and beverage valves, responsive to a quantity of beverage available in a container, to close the valves of an empty container and to open the valves of a container with beverage therein; and dispensing control means including a valve in the common portion of said conduit.

7. A beverage dispensing apparatus, comprising: a plurality of prepared beverage containers; a dispensing point; conduit means connecting said containers with said dispensing point; a common control means for dispensing beverage from each of said containers and including a selector portion for determining from which container to dispense; a float in each of said containers; a magnet carried by each of said floats; an electrical switch outside each container for actuation by said magnets, said switches being connected in the selector portion of said dispensing control means.

References Cited in the file of this patent

UNITED STATES PATENTS

| | | |
|---|---|---|
| Re. 23,830 | Mojonnier | May 18, 1954 |
| 2,057,068 | Speer | Oct. 13, 1936 |
| 2,135,821 | Levings | Nov. 8, 1938 |
| 2,529,672 | Black | Nov. 14, 1950 |
| 2,655,858 | Hamlin | Oct. 20, 1953 |
| 2,748,689 | Rotman | June 5, 1956 |
| 2,786,408 | Herrera | Mar. 26, 1957 |
| 2,887,038 | Rosander | May 19, 1959 |
| 2,898,843 | Rockriver | Aug. 11, 1959 |
| 2,907,495 | Brous | Oct. 6, 1959 |
| 2,923,438 | Logan | Feb. 2, 1960 |
| 2,925,835 | Mojonnier et al. | Feb. 23, 1960 |
| 2,935,012 | Martin | May 3, 1960 |
| 2,954,145 | McCauley | Sept. 27, 1960 |

FOREIGN PATENTS

| | | |
|---|---|---|
| 20,943 | Germany | Feb. 23, 1883 |